United States Patent
Fevrier et al.

(10) Patent No.: US 7,567,593 B2
(45) Date of Patent: Jul. 28, 2009

(54) SYSTEM AND METHOD FOR FRACTIONAL RAMAN ORDER PUMPING IN OPTICAL COMMUNICATION SYSTEMS

(75) Inventors: Herve A. Fevrier, Plano, TX (US); Andrej B. Puc, Allen, TX (US); Do Il Chang, Allen, TX (US); Andrzej S. Kaminski, Allen, TX (US)

(73) Assignee: XTERA Communications, Inc., Allen, TX (US)

( * ) Notice: Subject to any disclaimer, the term of this patent is extended or adjusted under 35 U.S.C. 154(b) by 249 days.

(21) Appl. No.: 11/173,629

(22) Filed: Jun. 30, 2005

(65) Prior Publication Data

US 2007/0002904 A1    Jan. 4, 2007

(51) Int. Cl.
     *H01S 3/30*      (2006.01)
(52) U.S. Cl. .................... 372/3; 372/6; 372/69; 372/70
(58) Field of Classification Search ............... 372/3, 372/6, 69, 70
See application file for complete search history.

(56) References Cited

U.S. PATENT DOCUMENTS

| | | | |
|---|---|---|---|
| 6,163,636 A | * | 12/2000 | Stentz et al. .................. 385/24 |
| 6,700,696 B2 | * | 3/2004 | Dominic et al. ........ 359/341.32 |
| 6,721,088 B2 | * | 4/2004 | Brar et al. .................. 359/334 |
| 2003/0053192 A1 | | 3/2003 | Islam et al. ................. 359/327 |

OTHER PUBLICATIONS

PCT, Notification of Transmittal of the International Search Report and the Written Opinion of the International Searching Authority, or the Declaration, PCT/US06/25175, 7 pages, Jul. 12, 2007.

* cited by examiner

*Primary Examiner*—Minsun Harvey
*Assistant Examiner*—Yuanda Zhang
(74) *Attorney, Agent, or Firm*—Workman Nydegger (57) ABSTRACT

An optical communication system includes a gain medium that is capable of receiving at least one optical signal that includes one or more optical signal wavelengths. The system also includes one or more pump sources that are capable of generating at least one pump signal for introduction to the gain medium. The pump signal includes one or more fractional Raman order pump wavelengths having a Raman gain peak that is a non-integer multiple of one stokes shift from each of the one or more optical signal wavelengths. In one particular embodiment, the pump signal interacts with the optical signal as the pump signal traverses at least a portion of the gain medium.

20 Claims, 2 Drawing Sheets

SYSTEM AND METHOD FOR FRACTIONAL RAMAN ORDER PUMPING IN OPTICAL COMMUNICATION SYSTEMS

TECHNICAL FIELD OF THE INVENTION

This invention relates in general to the field of communication systems and, more particularly, to a system and method for implementing a fractional Raman order pumping scheme in an optical communication system.

BACKGROUND OF THE INVENTION

Conventional optical communication systems that implement multiple Raman order pumping to amplify one or more optical signal wavelengths typically seek to maximize energy transfer between first Raman order pump wavelengths and the optical signal wavelengths communicated through the system. These systems maximize the energy transfer by placing one or more pump wavelengths at approximately one stokes shift from the optical signal wavelengths. In addition, these systems typically seek to maximize the energy transfer between higher Raman order pump wavelengths and lower Raman order pump wavelengths by placing one or more higher Raman order pump wavelengths at approximately one stokes shift from the lower Raman order pump wavelengths. Consequently, the higher Raman order pump wavelengths of the conventional communication systems typically loose their energy faster and over a relatively short portion of a Raman amplifier.

SUMMARY OF THE DISCLOSURE

According to one embodiment, an optical communication system comprises a gain medium that is capable of receiving at least one optical signal comprising one or more optical signal wavelengths. The system also comprises one or more pump sources that are capable of generating at least one pump signal for introduction to the gain medium. The pump signal comprising one or more fractional Raman order pump wavelengths having a Raman gain peak that is a non-integer multiple of one stokes shift from each of the one or more optical signal wavelengths. In one particular embodiment, the pump signal interacts with the optical signal as the pump signal traverses at least a portion of the gain medium.

Depending on the specific features implemented, particular embodiments of the present disclosure may exhibit some, none, or all of the following technical advantages. Various embodiments may be capable of increasing the total reach of the optical system. Other embodiments may be capable of extending and/or delaying the point at which the optical signal wavelengths experience gain within a communication span. Other technical advantages will be readily apparent to one skilled in the art from the following figures, description and claims. Moreover, while specific advantages have been enumerated, various embodiments may include all, some or none of the enumerated advantages.

BRIEF DESCRIPTION OF THE DRAWINGS

To provide a more complete understanding of the present invention and features and advantages thereof, reference is made to the following description, taken in conjunction with the accompanying figures, wherein like reference numerals represent like parts, in which.

DETAILED DESCRIPTION OF EXAMPLE EMBODIMENTS

Figure 1:
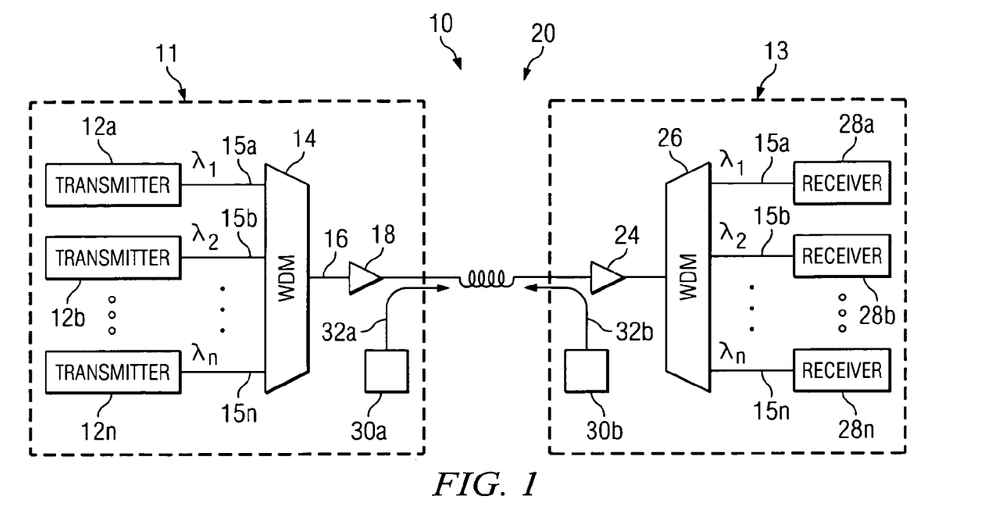
FIG. 1 is a block diagram showing at least a portion of an unrepeatered optical communication system operable to facilitate communication of one or more multiple wavelength signals.

FIG. 1 is a block diagram showing at least a portion of an unrepeatered optical communication system 10 operable to facilitate communication of one or more multiple wavelength signals 16. An "unrepeatered optical communication system" refers to an optical communication system having an optical communication span that includes only passive optical components between end terminals. That is, the communication span of an unrepeatered system is substantially free from components that require electrical power.

In this example, system 10 includes a plurality of transmitters 12a-12n operable to generate a plurality of optical signals (or channels) 15a-15n, each comprising a center wavelength of light. In some embodiments, each optical signal 15a-15n comprises a center wavelength that is substantially different from the center wavelengths of other signals 15. As used throughout this document, the term "center wavelength" refers to a time-averaged mean of the spectral distribution of an optical signal. The spectrum surrounding the center wavelength need not be symmetric about the center wavelength. Moreover, there is no requirement that the center wavelength represent a carrier wavelength. Transmitters 12 can comprise any device capable of generating one or more optical signals. Transmitters 12 can comprise externally modulated light sources, or can comprise directly modulated light sources.

In one embodiment, transmitters 12 comprise a plurality of independent light sources each having an associated modulator, with each source being operable to generate one or more optical signals 15. Alternatively, transmitter 12 could comprise one or more light sources shared by a plurality of modulators. For example, transmitter 12 could comprise a continuum source transmitter including a mode-locked source operable to generate a series of optical pulses and a continuum generator operable to receive a train of pulses from the mode-locked source and to spectrally broaden the pulses to form an approximate spectral continuum of optical signals. In that embodiment, a signal splitter receives the continuum and separates the continuum into individual signals each having a center wavelength. In some embodiments, transmitter 12 can also include a pulse rate multiplexer, such as a time division multiplexer, operable to multiplex pulses received from the mode locked source or the modulator to increase the bit rate of the system.

Transmitter 12, in some cases, may comprise a portion of an optical regenerator. That is, transmitter 12 may generate optical signals 15 based on electrical representations of electrical or optical signals received from other optical communication links. In other cases, transmitter 12 may generate optical signals 15 based on information received from sources residing locally to transmitters 12. Transmitter 12 could also comprise a portion of a transponder assembly (not explicitly shown), containing a plurality of transmitters and a plurality of receivers.

In various embodiments, transmitters 12 may include a forward error correction (FEC) module capable improving the Q-factor of signals 15 and the bit-error rate of system 10. For example, the FEC module may encode an FEC sequence, such as, Reed Solomon coding, Turbo Product Codes coding, Concatenated Reed-Solomon coding, or other algorithms capable of improving the Q-factor of signals 15 and the bit error rate of system 10. As used throughout this document, the term "Q-factor" refers to a metric for determining the quality of the signal communicated from a transmitter. The "Q-factor" associated with optical signals 15 communicated from transmitters 12 refers to the difference of the mean value of the high signal values ($M_H$) and the mean value of the low signal values ($M_L$) associated with an optical signal over the sum of the standard deviation of the multiple highs ($\Delta_H$) and the multiple lows ($\Delta_L$). The value of the Q-factor can be expressed in $dB_{20}$. In equation form, this relationship is expressed as:

$$Q = [M_H - M_L] \div [\Delta_H + \Delta_L]$$

In the illustrated embodiment, system 10 also includes a combiner 14 operable to receive optical signals 15a-15n and to combine those signals into a multiple wavelength signal 16. As one particular example, combiner 14 could comprise a wavelength division multiplexer (WDM). The terms wavelength division multiplexer and wavelength division demultiplexer as used herein may include equipment operable to process wavelength division multiplexed signals and/or equipment operable to process dense wavelength division multiplexed signals.

System 10 communicates multiple wavelength signal 16 over an optical communication span 20. Although this example includes one optical communication span 20, any additional number of spans can be used without departing from the scope of the present disclosure. Communication span 20 can comprise, for example, standard single mode fiber (SMF), dispersion shifted fiber (DSF), non-zero dispersion shifted fiber (NZDSF), dispersion compensating fiber (DCF), pure-silica core fiber (PSCF), or another fiber type or combination of fiber types. In various embodiments, span 20 can comprise a span length of, for example, 80 kilometers or more, 150 kilometers or more, 300 kilometers or more, or any other appropriate length. In this particular embodiment, span 20 comprises a span length of at least 400 kilometers.

Communication span 20 could comprise, for example, a unidirectional span or a bi-directional span. Span 20 could comprise a point-to-point communication link, or could comprise a portion of a larger communication network, such as a ring network, a mesh network, a star network, or any other network configuration. For example, communication span 20 could comprise one span or link of a multiple link system, where each link couples to other links through, for example, optical regenerators.

In this embodiment, a separator 26 separates individual optical signal 15a-15n from multiple wavelength signal 16 received at the end of span 20. Separator 26 may comprise, for example, a wavelength division demultiplexer (WDM). Separator 26 communicates individual signal wavelengths or ranges of wavelengths to a bank of receivers 28 and/or other optical communication paths. One or more of receivers 28 may comprise a portion of an optical transceiver operable to receive and convert signals between optical and electrical formats.

System 10 further includes a plurality of optical amplifiers coupled to communication span 20. In this example, system 10 includes a booster amplifier 18 operable to receive and amplify wavelengths of signal 16 in preparation for transmission over a communication medium 20. The illustrated example also implements a preamplifier 24 operable to amplify signal 16 received from fiber span 20 prior to communicating signal 16 to separator 26. Although system 10 includes one or more booster amplifiers 18 and preamplifiers 24, one or more of the amplifier types could be eliminated in other embodiments.

Amplifiers 18 and 24 could each comprise, for example, one or more stages of Raman amplification, rare earth doped amplification stages, such as erbium doped or thulium doped stages, semiconductor amplification stages or a combination of these or other amplification stage types. In some embodiments, amplifiers 18 and 24 could each comprise bi-directional Raman amplifiers. Throughout this document, the term "amplifier" denotes a device or combination of devices operable to at least partially compensate for at least some of the losses incurred by signals while traversing all or a portion of system 10. Likewise, the terms "amplify" and "amplification" refer to offsetting at least a portion of losses that would otherwise be incurred.

An amplifier may, or may not impart a net gain to a signal being amplified. Moreover, the terms "gain" and "amplify" as used throughout this document do not (unless explicitly specified) require a net gain. In other words, it is not necessary that a signal experiencing "gain" or "amplification" in an amplifier stage experience enough gain to overcome all losses in the amplifier stage or in the fiber connected to the amplifier stage. As a specific example, distributed Raman amplifier stages typically do not experience enough gain to offset all of the losses in the transmission fiber that serves as a gain medium. Nevertheless, these devices are considered "amplifiers" because they offset at least a portion of the losses experienced in the transmission fiber.

Depending on the amplifier types chosen, one or more of amplifiers 18 and/or 24 could comprise a wide band amplifier operable to amplify all optical signals 15a-15n received. Alternatively, one or more of those amplifiers could comprise a parallel combination of narrower band amplifier assemblies, wherein each amplifier in the parallel combination is operable to amplify a portion of the wavelengths of multiple wavelength signal 16. In that case, system 10 could incorporate signal separators and/or signal combiners surrounding the parallel combinations of amplifier assemblies to facilitate amplification of a plurality of groups of wavelengths for separating and/or combining or recombining the wavelengths for communication through system 10.

System 10 also includes a first pump source 30a capable of generating a first pump signal 32a for introduction to span 20 and a second pump source 30b capable of generating a second pump signal 32b for introduction to span 20. Although this example includes two pump sources 30 and two pump signals 32, any other number of pump sources and/or pump signals could be used, or one or more of pump sources 30 and/or pump signals 32 could be excluded without departing from the scope of the present disclosure. Pump signals 32a and 32b can each comprise one or more pump wavelengths, each of the one or more pump wavelengths comprising a center wavelength of light. Pump source 30 can comprise any device or combination of devices capable of generating one or more pump signal wavelengths at desired power levels and wavelengths. For example, pump source 30 can comprise a solid state laser, such a Nd:YAG or Nd:YLF laser, a semiconductor laser such as a Ytterbium doped fiber laser, a laser diode, a cladding pump fiber laser, or any combination of these or other light sources.

In this example, pump signal 32a co-propagates through span 20 in relation to signal 16, while pump signal 32b counter-propagates through span 20 in relation to optical signal 16. As used throughout this document, the term "co-propagates" or "co-propagating" refers to a condition where, for at least some time at least a portion of the pump signal propagates through the gain medium in the same direction as at least one wavelength of the optical signal being amplified. In addition, the term "counter-propagates" or "counter-propagating" refers to a condition where at least a portion of a pump signal propagates through a gain medium of an optical device in a direction counter to the direction of the optical signal being amplified. Although system 10 introduces pump signal 32a and pump signal 32b to span 20 in this example, one or more of pump signals 32a and 32b could be eliminated in other embodiments.

In the illustrated embodiment, system 10 uses at least a portion of the optical fiber of span 20 as a distributed Raman amplifier gain medium that is capable of at least partially compensating for at least some of the losses incurred by signal 16 while traversing span 20. Conventional unrepeatered systems that amplify one or more optical signal wavelengths in a distributed Raman amplifier typically implement a multiple Raman order pumping scheme by introducing a plurality of integer Raman order pump wavelengths to the distributed Raman amplifier. An integer Raman order pump wavelength is a pump wavelength that has a Raman gain peak at an integer multiple of one-stokes shift (e.g., approximately 13.2 THz) from an optical signal wavelength being communicated through the system. For example, a first order Raman pump wavelength refers to a pump wavelength that has a Raman gain peak at one stokes shift (e.g., approximately 13.2 THz) from an optical signal wavelength, while a second order Raman pump wavelength refers to a pump wavelength that has a Raman gain peak at two stokes shifts (e.g., approximately 26.4 THz) from an optical signal wavelength and one stokes shift (e.g., approximately 13.2 THz) from a first Raman order pump wavelength.

Conventional unrepeatered optical communication systems that implement multiple Raman order pumping to amplify one or more optical signal wavelengths in a distributed Raman amplifier typically seek to maximize Raman efficiency (e.g., energy transfer), and therefore gain, between first Raman order pump wavelengths and the optical signal wavelengths communicated through the system. These systems maximize the energy transfer by placing one or more pump wavelengths at approximately one stokes shift from the optical signal wavelengths. In addition, these systems typically seek to maximize the energy transfer between second Raman order pump wavelengths and the first Raman order pump wavelengths by placing one or more second Raman order pump wavelengths at approximately one stokes shift from the first Raman order pump wavelengths. In some cases, these systems can also seek to maximize the energy transfer between higher integer Raman order pump wavelengths and lower integer Raman order pump wavelengths by placing the higher integer Raman order pump wavelengths at approximately one stokes shift from the lower integer Raman order pump wavelengths. However, maximizing Raman efficiency between the first (e.g., lower) and second (e.g., higher) Raman order pump wavelengths rapidly depletes the energy of the second Raman order pump wavelengths and minimizes the length of effective interaction between the first and second Raman order pump wavelengths, while providing the highest local gain in the line fiber. As a result, the second (e.g., higher) Raman order pump wavelengths of the conventional communication systems typically transfer energy to the first (e.g., lower) Raman order pump wavelengths only over a relatively short portion of the distributed Raman amplifier.

Unlike conventional unrepeatered systems, system 10 introduces one or more fractional Raman order pump wavelengths to span 20. A "fractional order Raman pump wavelength" is a pump wavelength having a Raman gain peak that is not an integer multiple of one-stokes shift (e.g., approximately 13.2 THz) from any optical signal wavelength being communicated through the system. In other words, a fractional Raman order pump wavelength can comprise any pump wavelength having a Raman gain peak that is a non-integer multiple of one-stokes shift from all of optical signals 15a-15n. In one non-limiting example, a fractional Raman order pump wavelength can comprise a pump wavelength having a Raman gain peak that is between 1.3 and 1.8 stokes shifts from one of optical signals 15 and that is a non-integer multiple of one-stokes shift from all of the other optical signals 15.

In various embodiments, pump signal 32a and/or pump signal 32b could comprise one or more fractional Raman order pump wavelengths. In other embodiments, pump signal 32a and/or pump signal 32b could comprise one or more fractional Raman order pump wavelengths and/or one or more integer Raman order pump wavelengths. In this particular embodiment, pump signals 32a and 32b each include a plurality of first Raman order pump wavelengths and a plurality of fractional Raman order pump wavelengths that are used to amplify at least the first Raman order pump wavelengths. Although pump signals 32a and 32b include a plurality of first and fractional Raman order pump wavelengths, any other combination of integer and/or fractional Raman order pump wavelengths can be used without departing from the scope of the present disclosure.

In the illustrated embodiment, transmitters 12, combiner 14, booster amplifier 18, and pump source 30a reside within a first terminal 11, while receivers 28, separator 26, pre-amplifier 24, and pump source 30b reside within a second terminal 13. Although in this example terminal 11 includes transmitters 12, combiner 14, amplifier 18, and pump source 30a, and terminal 13 includes receivers 28, separator 26, amplifier 24 and pump source 30b, terminals 11 and 13 can each include any combination of transmitters, receivers, combiners, separators, pump sources, and/or amplifiers without departing from the scope of the present disclosure. Additionally, terminals 11 and 13 may include any other optical component. In some cases, terminals 11 and 13 can be referred to as end terminals. The phrase "end terminal" refers to devices operable to perform optical-to-electrical and/or electrical-to-optical signal conversion and/or generation.

In various embodiments, end terminals 11 and 13 can include one or more dispersion compensating elements capable of at least partially compensating for chromatic dispersion associated with signal 16. In some embodiments, the dispersion compensating element can comprise a dispersion length product that approximately compensates for the dispersion accumulated by optical signal 16 while traversing span 20 of system 10. In other embodiments, at least a portion of a gain medium of amplifiers 18 and/or 24 may comprise a dispersion compensating fiber that is capable of at least partially compensating for chromatic dispersion associated with signal 16. In those embodiments, the dispersion compensating fiber can comprise a slope of dispersion that is equal to and opposite from the slope of chromatic dispersion associated with multiple wavelength signal 16.

One aspect of this disclosure recognizes that the length of span 20 (e.g., the distance between end terminals 11 and 13) can be increased by implementing one or more fractional Raman pump wavelengths within pump signal 32a and/or pump signal 32b. That is, the reach of system 10 and/or the distance multiple wavelength signal 16 can be communicated through span 20 can be increased by using one or more fractional Raman order pump wavelengths within pump signals 32a and/or 32b. Conventional design approaches may not have recognized this technique as advantageous, because introducing a fractional Raman order pump wavelength to amplify an integer Raman order pump wavelength tends to reduce the efficiency of the energy transfer between the pump wavelengths. However, as described below, introducing a relatively lower gain to the integer Raman order pump wavelengths or the optical signal wavelengths over an increased length of span 20 can advantageously increase the reach of system 10 by extending the point at which signal 16 experiences gain within span 20. In addition, introducing a relatively lower gain to the integer Raman order pump wavelengths or the optical signal wavelengths can, in some cases, reduce the maximum power of signal 16 within span 20, reducing the maximum power of signal 16 can operate to reduce the non-linear penalties experienced by signal 16.

In most cases, implementing one or more fractional Raman order pump wavelengths within pump signal 32a and/or pump signal 32b tends to reduce the rate at which the first Raman order pump wavelengths deplete the optical power associated with the fractional Raman order pump wavelengths. That is, implementing one or more fractional Raman order pump wavelengths reduces the efficiency of the energy transfer from the fractional Raman order pump wavelengths to the first Raman order pump wavelengths. Because of the reduced efficiency, the fractional Raman order pump wavelengths operate to introduce a relatively lower gain to the first Raman order pump wavelengths over an increased length of span 20. Introducing a relatively lower gain to the first Raman order pump wavelengths over an increased length of span 20 can advantageously maintain the first Raman order pump wavelengths at a power level that is higher than a comparable pump signal that implements only integer Raman order pump wavelengths over at least a portion of span 20.

In this example, the one or more fractional Raman order pump wavelengths of pump signal 32a operate to increase the distance over which the fractional Raman order pump wavelengths effectively interact (e.g., transfer energy or amplify) with the first Raman order wavelengths within communication span 20. Although this example is described with respect to pump signal 32a, similar benefits and interactions can be achieved with respect to pump signal 32b. The distance over which the fractional Raman pump wavelengths effectively interact with the first Raman order pump wavelengths increases because the fractional Raman order pump wavelengths operate to introduce a relatively lower gain to the first Raman order pump wavelengths over an increased length of the distributed Raman amplifier of the system. That is, implementing the fractional Raman order pump wavelengths reduces the efficiency of the energy transfer to the first Raman order pump wavelengths, which results in the fractional Raman order pump wavelengths introducing a relatively lower gain to the first Raman order pump wavelengths as the wavelengths are communicated through span 20.

Implementing one or more fractional Raman order pump wavelengths within pump signal 32a can also operate to maintain a power level of the first Raman order pump wavelengths at a higher power level over longer distance than a comparable all inter Raman order pump signal over at least a portion of communication span 20. In most cases, increasing the length of span 20 over which the fractional Raman order wavelengths effectively interact, at a reduced Raman efficiency operates to maintain the power level of the first Raman order pump wavelengths at a relatively higher-level over longer distance. Maintaining the power level of the first Raman order pump wavelengths at a relatively higher power level can maintain a power level of the optical signal wavelengths 15 of multiple wavelength signal 16 at a relatively higher power level over at least a portion of communication span 20.

In addition, implementing one or more fractional Raman order pump wavelengths within pump signal 32a can also operate to extend or delay the point at which multiple wavelength signal 16 experiences gain within span 20 when compared to a system that implement only integer Raman order pumping. In most cases, increasing the length of span 20 over which the fractional Raman order pump wavelengths effectively interact with the first Raman order pump wavelengths operates to extend or delay the point at which multiple wavelength signal 16 experiences gain within span 20.

In this embodiment, system 10 comprises an unrepeatered system. In alternative embodiments, system 10 can comprise a repeatered system that includes a plurality of communication spans 20. Where communication system 10 includes a plurality of communication spans 20, system 10 can also include one or more in-line amplifiers. The in-line amplifiers couple to one or more spans 20 and operate to amplify signal 16 as it traverses system 10. In that embodiment, two or more spans can collectively form a first optical link. Moreover, such a repeater system could include any number of additional links coupled to the first link. For example, the first link could comprise one optical link of a multiple link system, where each link is coupled to other links through, for example, optical regenerators.

Finally, where system 10 comprises a repeater system, such system may further include one or more access elements. For example, the access element could comprise an add/drop multiplexer, a cross connect, or another device operable to terminate, cross connect, switch, route, process, and/or provide access to and from system 10 and another system or communication device. System 10 may also include one or more lossy elements (not explicitly shown) and/or gain elements capable of at least partially compensating for the lossy element coupled between spans 20. For example, the lossy element could comprise a signal separator, a signal combiner, an isolator, a dispersion compensating element, a circulator, or a gain equalizer.

Figure 2:
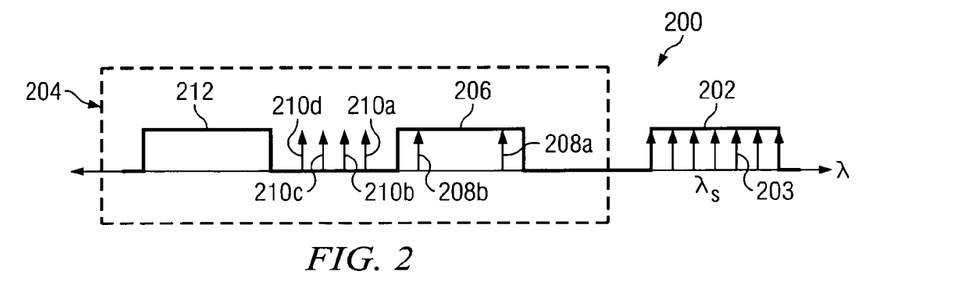
FIG. 2 is a block diagram illustrating one example of a fractional Raman order pumping scheme.

FIG. 2 is a block diagram illustrating one example of a fractional Raman order pumping scheme 200. Pumping scheme 200 can be implemented in any optical communication system where it is desirable to increase the distance between active optical components and/or end terminals. In one particular non-limiting embodiment, pumping scheme 200 can be implemented in unrepeatered optical communication system 10 of FIG. 1. The particular wavelengths and/or combinations of wavelengths illustrated in FIG. 2 are intended for illustrative purposes only and are not intended to limit the scope of the present disclosure. It should be appreciated that other embodiments or combinations of wavelengths may be used without departing from the scope of the present disclosure.

In this example, fractional Raman order pumping scheme 200 includes a pump signal 204 that is capable of amplifying an optical signal 202 within a distributed Raman amplifier of a communication system. Optical signal 202 can comprise one or more optical signal wavelengths 203, each comprising a center wavelength of light. In this particular non-limiting example, optical signal 202 includes thirty (30) optical signal wavelengths each having a center wavelength between 1567.5 nm and 1592.5 nm and separated by approximately one-hundred (100) GHz from adjacent center wavelengths. Although this example includes thirty optical signal wavelengths, any other number of wavelengths could be used without departing from the scope of the present disclosure.

Pump signal 204 can comprise one or more integer Raman order band of pump wavelengths and one or more fractional Raman order pump wavelengths 210. The phrase "integer Raman order band of pump wavelengths" refers to all pump wavelengths that are an integer multiple of one-stokes shift from any one of the plurality of optical signal wavelengths 203 of optical signal 202. For example, pump signal 204 can comprise a first Raman order band of wavelengths 206 that includes one or more pump wavelengths that are approximately one stokes shift from any one of optical signal wavelengths 203, and a second Raman order band of wavelengths 212 that includes one or more pump wavelengths that are approximately two stokes shifts from any one of optical signal wavelengths 203. In this particular embodiment, each of fractional Raman order pump wavelengths 210 resides between first Raman order band of pump wavelengths 206 and second Raman order band of pump wavelengths 212. Although fractional Raman order pump wavelengths 210 reside between band 206 and band 212 in this example, fractional Raman order pump wavelengths 210 can reside between any integer Raman order band of pump wavelengths without departing from the scope of the present disclosure.

In the illustrated embodiment, pump signal 204 includes first Raman order band of pump wavelengths 206 and one or more fractional Raman order pump wavelengths 210. In one non-limiting example, first Raman order band of pump wavelengths 206 includes two first Raman order pump wavelengths 208a and 208b each having a center wavelength at approximately 1488 nm and 1463 nm, respectively. In that example, pump signal 204 also includes four fractional Raman order pump wavelengths 210a-210d each having center wavelength at approximately 1450 nm, 1437 nm, 1424 nm, and 1412 nm, respectively. Although this example includes two first Raman order pump wavelengths and four fractional Raman order pump wavelengths, any additional number of wavelengths can be included and/or one or more of wavelengths 208 and/or 210 can be excluded without departing from the scope of the present disclosure.

In operation, fractional Raman order pump wavelengths 210 operate to amplify at least the first Raman order pump wavelengths 208, while the first Raman order pump wavelengths operate to amplify optical signal wavelengths 203 as pump signal 204 traverses a communication span of the communication system. In this particular embodiment, pump signal 204 co-propagates with optical signal 202 while traversing the communication span of the system. Although pump signal 204 co-propagates with optical signal 202 in this example, at least a portion of pump signal 204 could counter-propagate with optical signal 202 without departing from the scope of the present disclosure.

In various embodiments, implementing fractional Raman order pump wavelengths 210 can increase the distance over which the fractional Raman pump wavelengths 210 effectively interact (e.g., amplify) with the first Raman order wavelengths 208. The distance over which the fractional Raman pump wavelengths 210 amplify the first Raman order pump wavelengths 208 increases because the fractional Raman order pump wavelengths 210 operate to introduce a relatively lower gain to the first Raman order pump wavelengths 208 over an increased length of the distributed Raman amplifier of the system. That is, implementing fractional Raman order pump wavelengths 210 reduces the efficiency of the energy transfer to the first Raman order pump wavelengths 208, which results in the fractional Raman order pump wavelengths 210 introducing a relatively lower gain to the first Raman order pump wavelengths 208.

In other embodiments, implementing fractional Raman order pump wavelengths 210 can maintain a power level of the first Raman order pump wavelengths 208 at a relatively higher power level over a relatively longer distance than a comparable all inter Raman order pump signal over at least a portion of a distributed Raman amplifier. Maintaining the power level of the first Raman order pump wavelengths 208 at a relatively higher power level can maintain a power level of the optical signal wavelengths 203 at a relatively higher power level over at least a portion of the distributed Raman amplifier of the system.

Figure 3A:
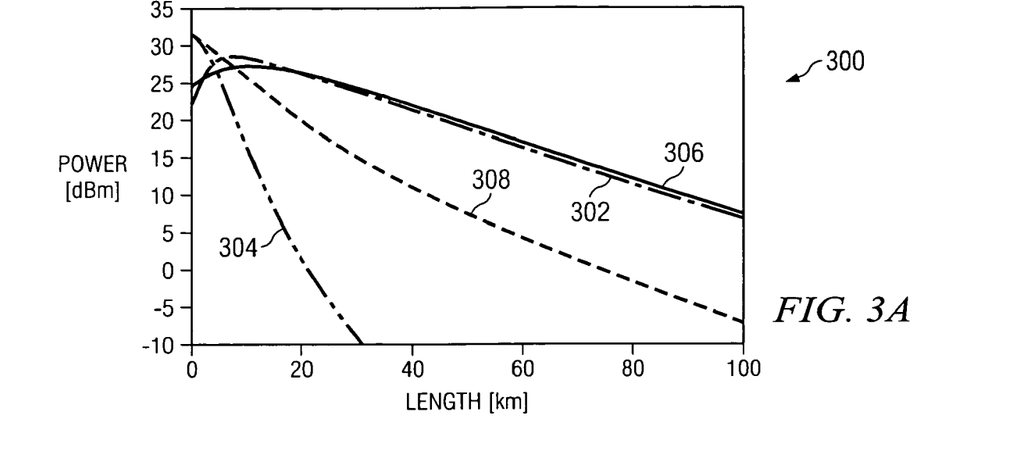
FIGS. 3a through 3c are graphs illustrating computed results of pump signals and optical signals that are communicated through an unrepeatered optical communication system.
Figure 3B:
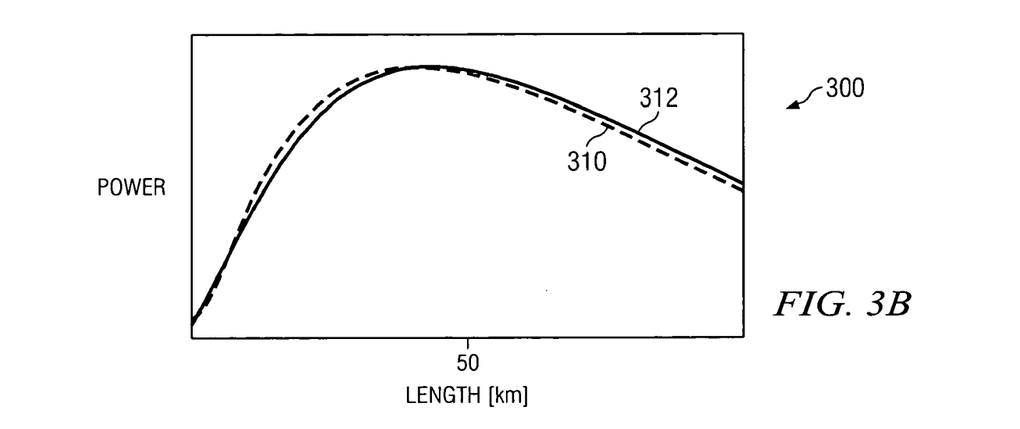
Figure 3C:
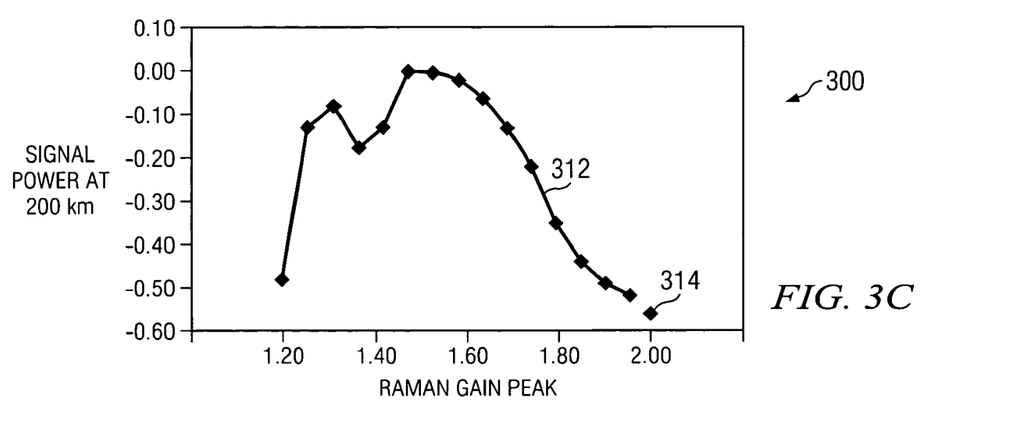

FIGS. 3a through 3c are graphs illustrating computed results of pump signals and optical signals that are communicated through an unrepeatered optical communication system 300. The unrepeatered system 300 can be substantially similar in structure and function to unrepeatered system 10 of FIG. 1. The particular wavelengths and/or combinations of wavelengths illustrated in FIGS. 3a through 3c are intended for illustrative purposes only and are not intended to limit the scope of the present disclosure. It should be appreciated that other embodiments or combinations of wavelengths may be used without departing from the scope of the present disclosure.

In this example, system 300 includes a communication span that comprises standard single mode fiber that facilitates the communication of one or more optical signals through system 300. System 300 also includes a pump source that generates one or more pump signals for introduction to the communication span of system 300. The structure and function of the communication span and the pump source can be substantially similar to communication span 20 and pump source 30 of FIG. 1, respectively. In this particular embodiment, the pump source operates to introduce pump signals such that the pump signals co-propagate with the optical signals while traversing the communication span. Although the pump signals co-propagate with the optical signals in this example, at least a portion of the pump signals could counter-propagate with the optical signals without departing from the scope of the present disclosure.

In this particular embodiment, the pump source is capable of generating a first pump signal that implements all integer Raman order pump wavelengths and that is capable of amplifying an optical signal wavelength 310. Specifically, the first pump signal includes a first pump wavelength 302 having a Raman gain peak at one stokes shift (e.g., approximately 13.2 THz) from optical signal wavelength 310 and a second pump wavelength 304 having a Raman gain peak at two stokes shifts (e.g., approximately 26.4 THz) from optical signal wavelength 310 and one stokes shift (e.g., approximately 13.2 THz) from first pump wavelength 302. In one non-limiting example, optical signal wavelength 310 comprises a wavelength having a center wavelength at approximately 1592.1 nm, while first pump wavelength 302 and second pump wavelength 304 comprise pump wavelengths having center wavelengths at approximately 1488 nm and 1396 nm, respectively. Although the optical signal includes one optical signal wavelength and the first pump signal includes two pump wavelengths in this example, any number of optical signal wavelengths and/or pump wavelengths can be used without departing from the scope of the present disclosure.

The pump source of system 300 is also capable of generating a second pump signal that is capable of amplifying an optical signal wavelength 312 and that implements at least one integer Raman order pump wavelength and at least one fractional Raman order pump wavelength. In one non-limiting example, optical signal wavelength 312 comprises a wavelength having a center wavelength at approximately 1592.1 nm. In the illustrated embodiment, the second pump signal includes a third pump wavelength 306 having a Raman gain peak at one stokes shift (e.g., approximately 13.2 THz) from optical signal wavelength 312 and a fractional Raman order pump wavelength 308 having a Raman gain peak that is not an integer multiple of one-stokes shift from any of optical signals communicated through system 300.

FIG. 3a is a graph comparing power levels of a first pump wavelength 302 and a third pump wavelength 306 as the pump wavelengths are communicated through unrepeatered system 300. In the illustrated embodiment, fractional Raman order pump wavelength 308 has a Raman gain peak that is 1.5 stokes shifts from optical signal 312 and that is a non-integer multiple of one-stokes shift from any other optical signals communicated through system 300. Although fraction Raman order pump wavelength 308 has its Raman gain peak at 1.5 stokes shifts from optical signal 312 in this example, any other fractional Raman order can be used without departing from the scope of the present disclosure. In one non-limiting example, while third pump wavelength 306 and fractional Raman order pump wavelength 308 comprise pump wavelengths having center wavelengths at approximately 1488 nm and 1440 nm, respectively. Although this example implements wavelengths having center wavelengths at approximately 1488 nm and 1440 nm, any other appropriate wavelengths could be implemented without departing from the scope of the present disclosure.

In this example, line 302 represents the power level of the first pump wavelength as the pump wavelength is communicated through system 300, while line 304 represents the power level of the second pump wavelength as the pump wavelength is communicated through system 300. Line 306 represents the power level of the third pump wavelength as the pump wavelength is communicated through system 300, while line 308 represents the power level of the fractional Raman order pump wavelength as the pump wavelength is communicated through system 300. In this example, second pump wavelength 304 operates to amplify first pump wavelength 302, while fractional Raman order pump wavelength 308 operates to amplify third pump wavelength 306. In this example, the horizontal axis represents the distance that the pump wavelengths have traversed through a communication span of system 300, while the vertical axis represents a power level of the pump wavelengths.

As illustrated in this graph, by placing second pump wavelength 304 at approximately one stokes shift from first pump wavelength 302 and maximizing Raman efficiency (e.g., energy transfer), first pump wavelength 302 rapidly depletes the energy of second pump wavelength 304. Moreover, maximizing the Raman efficiency between first and second pump wavelengths 302 and 304 minimizes the length of effective interaction of the first and second pump wavelengths. That is, because of the efficient energy transfer, second pump wavelength 304 transfers energy to first pump wavelength 302 only over a relatively short portion of a communication span.

This graph illustrates that implementing a fractional Raman order pump wavelength (e.g., wavelength 308) can increase the distance over which the fractional Raman pump wavelength effectively interacts (e.g., amplifies) with the first Raman order pump wavelength (e.g., third pump wavelength 306). The distance over which the fractional Raman pump wavelength 308 amplifies the third pump wavelength 306 increases because the fractional Raman order pump wavelength 308 operates to introduce a relatively lower gain to the third pump wavelength 306 over an increased length of the communication span of system 300. That is, implementing fractional Raman order pump wavelength 308 reduces the efficiency of the energy transfer to the third pump wavelength 306, which results in the fractional Raman order pump wavelength 308 introducing a relatively lower gain to the third pump wavelength 306 over an increased length of the communication span of system 300.

This graph further illustrates that introducing a relatively lower gain to third pump wavelength 306 over an increased length of the communication span advantageously maintains third pump wavelength 306 at a power level that is higher than a power level associated with first pump wavelength 302 over at least a portion of the communication span. In particular, after each of pump wavelengths 302 and 306 traverse approximately thirty kilometers of the communication span, the power level of third pump wavelength 306 becomes higher than a power level of first pump wavelength 302. Moreover, after each of pump wavelengths 302 and 306 traverse approximately thirty kilometers of the communication span, the power level of third pump wavelength 306 is maintained at a higher power level than the power level of first pump wavelength 302.

FIG. 3b is a graph comparing power levels of first optical signal wavelength 310 and second optical signal wavelength 312 as the optical signal wavelengths are communicated through unrepeatered system 300. In this example, line 310 represents the power level of the first optical signal wavelength as the wavelength is communicated through system 300, while line 312 represents the power level of the second optical signal wavelength as the wavelength is communicated through system 300. In this particular embodiment, first pump wavelength 302 operates to amplify first optical signal wavelength 310, while third pump wavelength 306 operates to amplify second optical signal wavelength 312. In this example, the horizontal axis represents the distance that the optical signal wavelengths have traversed through a communication span of system 300, while the vertical axis represents a power level of the pump signals.

This graph illustrates that implementing a fractional Raman order pump wavelength to pump third pump wavelength 306 advantageously maintains second optical signal wavelength 312 at a power level that is higher than a power level associated with first optical signal wavelength 310 over at least a portion of the communication span. In particular, after each of optical signal wavelengths 310 and 312 traverse approximately forty-five kilometers of the communication span, the power level of second optical signal wavelength 312 becomes higher than a power level of first optical signal wavelength 310. Moreover, after each of optical signal wavelengths 310 and 312 traverse approximately forty-five kilometers of the communication span, the power level of second optical signal wavelength 312 is maintained at a higher power level than the power level of first optical signal wavelength 310. Because optical signal wavelength 312 is at a higher power level than optical signal 310 the reach of system 300 and/or the distance optical signal 312 can be communicated through the communication span can advantageously be increased.

This graph further illustrates that implementing a fractional Raman order pump wavelength to pump third pump wavelength 306 advantageously extends or delays the point at which optical signal wavelength 312 experiences its maximum power within the communication span when compared to optical signal wavelength 310. In particular, the maximum power experienced by optical signal wavelength 310 occurs after optical signal wavelength 310 traverses approximately forty kilometers, while the maximum power experienced by optical signal wavelength 312 occurs after optical signal wavelength 312 traverses approximately forty-eight kilometers of the communication span.

FIG. 3c is a graph illustrating the power level of optical signal wavelength 312 after traversing approximately 200 kilometers of the communication span as the order fraction of fractional Raman order pump wavelength 308 is varied. In this example, line 312 represents the power level of the second optical signal wavelength after traversing approximately 200 kilometers of the communication span of system 300, while data point 314 represents the power level of first optical signal wavelength 310 after traversing approximately 200 kilometers of the communication span of system 300. The horizontal axis represents location of the fractional Raman order pump wavelength 308, expressed as a fraction of the Raman stoke order, while the vertical axis represents a power level of the optical signal wavelengths after traversing approximately 200 kilometers of the communication span of system 300.

In this particular embodiment, the Raman gain peak associated with fractional Raman order pump wavelength 308 varies between 1.2 and 1.95 stokes shifts from optical signal 312. This graph illustrates that implementing a fractional Raman order wavelength can advantageously maintain the power level of optical signal wavelength 312 higher than the power level of optical signal wavelength 310 upon proper selection of the location of the Raman gain peak. In particular, the power level of optical signal wavelength 312 can be at least 0.5 dB higher than the power level of optical signal wavelength 310 when the Raman gain peak of fractional Raman order pump wavelength is 1.5 stokes shifts from optical signal 312. Because optical signal wavelength 312 is at a higher power level than optical signal 310 the reach of system 300 and/or the distance optical signal 312 can be communicated through the communication span can advantageously be increased.

Figure 4:
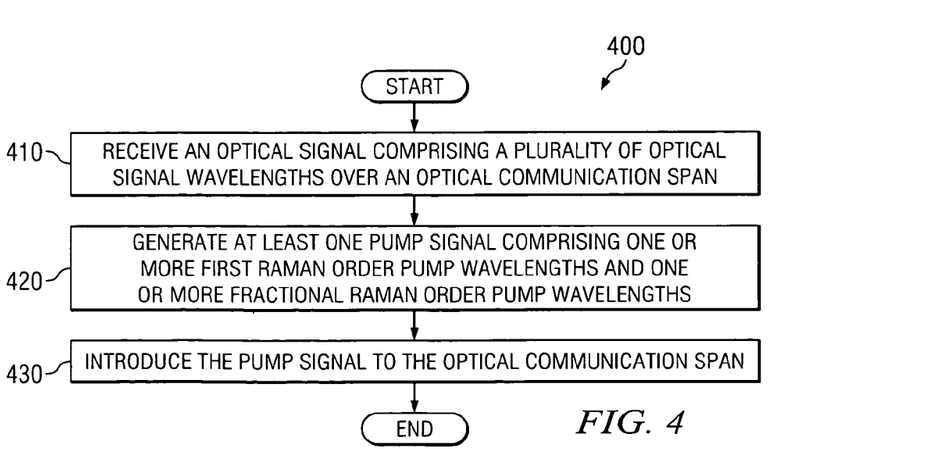
FIG. 4 is a flow chart showing one example of a method of amplifying an optical signal in an unrepeatered optical communication system by implementing a pump signal that includes one or more fractional Raman order pump wavelengths.

FIG. 4 is a flow chart showing one example of a method 400 of amplifying an optical signal in an unrepeatered optical communication system by implementing a pump signal that includes one or more fractional Raman order pump wavelengths. In one particular embodiment, the optical signal may be amplified within unrepeatered system 10 of FIG. 1. In various embodiments, system 10 can include one or more transmitters 12a-12n capable of generating a plurality of optical signal wavelengths 15, each comprising a center wavelength of light. In some embodiments, transmitters 12 may include a forward error correction (FEC) module capable improving the Q-factor of signals 15 and the bit-error rate of system 10. In other embodiments, system 10 can also include a combiner 14 capable of combining each of the plurality of optical signal wavelengths 15 into a multiple wavelength signal 16 for communication across communication span 20. In this example, method 400 begins at step 410 by receiving an optical signal 16 comprising a plurality of optical signal wavelengths 15 over an optical communication span 20.

System 10 also includes a first pump source 30a capable of generating a first pump signal 32a for introduction to span 20. Pump signal 32a can comprise one or more pump wavelengths, each of the one or more pump wavelengths comprising a center wavelength of light. In some embodiments, each of the one or more pump wavelengths within pump signal 32a can comprise a center wavelength that is substantially different from the center wavelengths of the other pump wavelengths within pump signal 32a.

In this example, pump source 30a generates at least one pump signal 32a comprising one or more first Raman order pump wavelengths and one or more fractional Raman order pump wavelengths at step 420. The first order Raman pump wavelength refers to a pump wavelength that has a Raman gain peak at one stokes shift (e.g., approximately 13.2 THz) from an optical signal wavelength within optical signal 16, while the fractional Raman order pump wavelength refers to a pump wavelength that has a Raman gain peak that is a non-integer multiple of one stokes shift from all the optical signal wavelengths within optical signal 16. In one non-limiting example, a fractional Raman order pump wavelength can comprise a pump wavelength having a Raman gain peak that is 1.5 stokes shifts from one of optical signals 15 and that is not an integer multiple of one-stokes shift from any other of optical signals 15.

Unrepeatered system 10 introduces pump signal 32 to optical communication span 20 at step 430. In this example, pump signal 32a co-propagates through span 20 in relation to signal 16 and operates to amplify signal 16 within communication span 20. In particular embodiments, the fractional Raman order pump wavelengths operate to amplify at least the first Raman order pump wavelengths, while the first Raman order pump wavelengths operate to amplify multiple wavelength optical signal 16 as pump signal 32a traverses communication span 20. In this particular embodiment, pump signal 32a co-propagates with optical signal 16 while traversing communication span 20. Although pump signal 32a co-propagates with optical signal 16 in this example, at least a portion of pump signal 32a could counter-propagate with optical signal 16 without departing from the scope of the present disclosure.

In various embodiments, implementing one or more fractional Raman order pump wavelengths can increase the distance over which the fractional Raman pump wavelengths effectively interact (e.g., amplify) with the first Raman order wavelengths. The distance over which the fractional Raman pump wavelengths amplify the first Raman order pump wavelengths increases because the fractional Raman order pump wavelengths operate to introduce a relatively lower gain to the first Raman order pump wavelengths over an increased length of the distributed Raman amplifier of the system. That is, implementing fractional Raman order pump wavelengths reduces the efficiency of the energy transfer to the first Raman order pump wavelengths, which can result in the fractional Raman order pump wavelengths introducing a relatively lower gain to the first Raman order pump wavelengths.

In other embodiments, implementing one or more fractional Raman order pump wavelengths can maintain a power level of the first Raman order pump wavelengths at a relatively higher power level than a comparable all inter Raman order pump signal over at least a portion of communication span 20. Maintaining the power level of the first Raman order pump wavelengths at a relatively higher power level can maintain a power level of the optical signal wavelengths 15 of optical signal 16 at a relatively higher power level over at least a portion of the distributed Raman amplifier of the system.

Although the present invention has been described in several embodiments, a myriad of changes, variations, alternations, transformations, and modifications may be suggested to one skilled in the art, and it is intended that the present invention encompass such changes, variations, alterations, alterations, transformations, and modifications as falling within the spirit and the scope of the appended claims.

What is claimed is:

1. An optical communication system comprising:
a gain medium capable of receiving at least one optical signal comprising one or more optical signal wavelengths;
one or more pump sources capable of generating at least a first pump signal and a second pump signal for introduction to the gain medium, the first pump signal comprising at least one integer Raman order band of pump wavelengths and the second pump signal comprising at least one fractional Raman order band of pump wavelengths, the at least one integer Raman order band of pump wavelengths comprising a plurality of integer Raman order pump wavelengths, each of the plurality of integer Raman order of pump wavelengths comprising a Raman gain peak that is one stokes shift from at least one of the one or more optical signal wavelengths, the at least one fractional Raman order band of pump wavelengths comprising a plurality of fractional Raman order pump wavelengths, each of the plurality of fractional Raman order pump wavelengths comprising a Raman gain peak that is a non-integer multiple of one stokes shift from each of the one or more optical signal wavelengths, wherein the non-integer multiple of one stokes shift from each of the one or more optical signal wavelengths is greater than 1.1 stokes shifts and less than 1.9 stokes shifts from each of the one or more optical signal wavelengths; and
wherein the at least one pump signal interacts with the optical signal as the pump signal traverses at least a portion of the gain medium.

2. The system of claim 1, wherein the one or more pump sources comprise:
a first pump source capable of generating at least the second pump signal that co-propagates within the gain medium with at least a portion of the optical signal, the second pump signal comprising the plurality of fractional Raman order pump wavelengths having a Raman gain peak that is a non-integer multiple of one stokes shift from each of the one or more optical signal wavelengths; and
a second pump source capable of generating at least a third pump signal that counter-propagates within the gain medium with at least a portion of the optical signal, the third pump signal comprising one or more fractional Raman order pump wavelengths having a Raman gain peak that is a non-integer multiple of one stokes shift from each of the one or more optical signal wavelengths.

3. The system of claim 1, wherein at least one of the one or more fractional Raman order pump wavelengths operates to amplify at least one of the integer Raman order pump wavelengths as the pump signal traverses the gain medium.

4. The system of claim 1, wherein the optical communication system further comprises:
a first end terminal coupled to a first end the gain medium and adapted to generate the at least one optical signal comprising one or more optical signal wavelengths; and
a second end terminal coupled to a second end of the gain medium and adapted to receive the at least one optical signal comprising one or more optical signal wavelengths after traversing the gain medium, wherein the gain medium is substantially free from optical components that require electrical power.

5. The system of claim 1, wherein at least one of the one or more fractional Raman order pump wavelengths comprises a Raman gain peak that is greater than approximately 1.3 stokes shifts from at least one of the one or more optical signal wavelengths and less than approximately 1.8 stokes shifts from at least one of the one or more optical signal wavelengths.

6. The system of claim 1, wherein at least a portion of the gain medium comprises a distributed Raman amplifier that amplifies the optical signal through Raman gain.

7. The system of claim 1, wherein the optical communication system comprises an unrepeatered optical communication system.

8. An unrepeatered optical communication system comprising:
a first end terminal coupled to a first end a transmission fiber and adapted to generate at least one optical signal comprising one or more optical signal wavelengths;
a second end terminal coupled to a second end of the transmission fiber and adapted to receive the at least one optical signal comprising one or more optical signal wavelengths after traversing the transmission fiber, wherein the transmission fiber is substantially free from optical components that require electrical power;
one or more pump sources capable of generating at least a first pump signal and a second pump signal for introduction to the transmission fiber, the first pump signal comprising a plurality of integer Raman order pump wavelengths and the second pump signal comprising a plurality of fractional Raman order pump wavelengths, each of the plurality of integer Raman order pump wavelengths comprising a Raman gain peak that is one stokes shift from at least one of the one or more optical signal wavelengths, each of the plurality of fractional Raman order pump wavelengths comprising a Raman gain peak that is a non-integer multiple of one stokes shift from all of the plurality of optical signal wavelengths, wherein the non-integer multiple of one stokes shift from all of the plurality of optical signal wavelengths is greater than 1.1 stokes shifts and less than 1.9 stokes shifts from all of the plurality of optical signal wavelengths; and
wherein the pump signal interacts with the at least one optical signal as the pump signal traverses the transmission fiber.

9. The system of claim 8, wherein at least one of the plurality of fractional Raman order pump wavelengths operates to amplify at least one of the plurality of integer Raman order pump wavelengths as the pump signal traverses the transmission fiber.

10. The system of claim 8, wherein the second pump signal co-propagates with the optical signal over at least a portion of the transmission fiber.

11. The system of claim 8, wherein the first pump signal counter-propagates with at least a portion of the optical signal over at least a portion of the transmission fiber.

12. The system of claim 8, wherein the transmission fiber comprises a length of at least two hundred kilometers.

13. The system of claim 8, wherein at least one of the plurality of fractional Raman order pump wavelengths comprises a Raman gain peak that is greater than approximately 1.3 stokes shifts from at least one of the plurality of optical signal wavelengths and less than approximately 1.8 stokes shifts from at least one of the plurality of optical signal wavelengths.

14. A method of communicating an optical signal in an unrepeatered optical communication system, the method comprising:
communicating at least one optical signal comprising a plurality of optical signal wavelengths over a gain medium;

generating at least a first pump signal comprising a plurality of integer Raman order pump wavelengths and second pump signal comprising a plurality of fractional Raman order pump wavelengths, each of the plurality of integer Raman order pump wavelengths comprising a Raman gain peak that is one stokes shift from at least one of the one or more optical signal wavelengths, each of the plurality of fractional Raman order pump wavelengths comprising a Raman gain peak that is non-integer multiple of one stokes shift from each of the plurality of optical signal wavelengths, wherein the non-integer multiple of one stokes shift from each of the plurality of optical signal wavelengths is greater than 1.1 stokes shifts and less than 1.9 stokes shifts from each of the plurality of optical signal wavelengths; and introducing the at least one pump signal to the gain medium, wherein the at least one pump signal interacts with the at least one optical signal as the at least one pump signal traverses at least a portion of the gain medium.

15. The method of claim 14, wherein the gain medium is substantially free from optical components that require electrical power.

16. The method of claim 14, wherein the at least one pump signal co-propagates with the optical signal over at least a portion of the gain medium.

17. The method of claim 14, wherein the at least one pump signal counter-propagates with the optical signal over at least a portion of the gain medium.

18. The system of claim 1, wherein the one or more pump sources comprise:

a first pump source capable of generating at least the second pump signal that co-propagates within the gain medium with at least a portion of the optical signal, the second pump signal comprising the plurality of fractional Raman order pump wavelengths having a Raman gain peak that is a non-integer multiple of one stokes shift from each of the one or more optical signal wavelengths; and a second pump source capable of generating at least the first pump signal that counter-propagates within the gain medium with at least a portion of the optical signal, the first pump signal comprising the plurality of integer Raman order pump wavelengths having a Raman gain peak that is one stokes shift from at least one of the one or more optical signal wavelengths, wherein at least one of the one or more fractional Raman order pump wavelengths operates to amplify at least one of the one or more integer Raman order pump wavelengths as the pump signal traverses the transmission fiber.

19. The system of claim 8, wherein the one or more pump sources comprise:

a first pump source capable of generating at least the second pump signal that co-propagates within the gain medium with at least a portion of the optical signal, the second pump signal comprising the plurality of fractional Raman order pump wavelengths comprising a Raman gain peak that is a non-integer multiple of one stokes shift from all of the plurality of optical signal wavelengths, wherein the non-integer multiple of one stokes shift from all of the plurality of optical signal wavelengths is greater than 1.1 stokes shifts and less than 1.9 stokes shifts from all of the plurality of optical signal wavelengths; and a second pump source capable of generating at least the first pump signal that counter-propagates within the gain medium with at least a portion of the optical signal, the first pump signal comprising the plurality of integer Raman order pump wavelengths having a Raman gain peak that is one stokes shift from at least one of the one or more optical signal wavelengths, wherein at least one of the plurality of fractional Raman order pump wavelengths operates to amplify at least one of the plurality of integer Raman order pump wavelengths as the pump signal traverses the transmission fiber.

20. The method of claim 14, wherein at least one of the plurality of fractional Raman order pump wavelengths operates to amplify at least one of the plurality of integer Raman order pump wavelengths as the pump signal traverses the transmission fiber.

* * * * *

UNITED STATES PATENT AND TRADEMARK OFFICE
CERTIFICATE OF CORRECTION

PATENT NO. : 7,567,593 B2  Page 1 of 1
APPLICATION NO. : 11/173629
DATED : July 28, 2009
INVENTOR(S) : Fevrier et al.

It is certified that error appears in the above-identified patent and that said Letters Patent is hereby corrected as shown below:

Column 1
Line 29, change "loose" to --lose--

Column 3
Line 20, change "lows $\Delta_L$)" to --lows $(\Delta_L)$--

Column 4
Line 13, change "earth doped" to --earth-doped--
Line 14, change "erbium doped or thulium doped" to --erbium-doped or thulium-doped--

Column 5
Line 1, change "Ytterbium doped" to --ytterbium-doped--

Column 7
Lines 22 and 23, change "span 20, reducing" to --span 20. Reducing--
Line 66, add --a-- after "over"

Column 8
Line 16, change "implement" to --implements--

Column 12
Line 60, change "310" to --310,--

Column 13
Line 38, change "310" to --310,--

Signed and Sealed this

Twenty-sixth Day of October, 2010

David J. Kappos
*Director of the United States Patent and Trademark Office*